United States Patent
Gaffney et al.

(10) Patent No.: US 8,172,061 B2
(45) Date of Patent: May 8, 2012

(54) CLUTCH FRICTION MATERIAL AND METHOD OF FORMING SAME

(75) Inventors: John Gaffney, N. Chelmsford, MA (US); David Giannelli, Burlington, MA (US); Roger Masse, Dracut, MA (US); Timothy Anguish, Whitmore Lake, MI (US)

(73) Assignees: GM Global Technology Operations LLC, Detroit, MI (US); Ballard Material Products, Lowell, MA (US)

( * ) Notice: Subject to any disclaimer, the term of this patent is extended or adjusted under 35 U.S.C. 154(b) by 701 days.

(21) Appl. No.: 12/238,505

(22) Filed: Sep. 26, 2008

(65) Prior Publication Data

US 2010/0078287 A1    Apr. 1, 2010

(51) Int. Cl.
*F16D 69/02*    (2006.01)

(52) U.S. Cl. ............ 192/107 M; 188/251 A; 427/249.2; 427/412; 442/101; 442/179

(58) Field of Classification Search ............. 192/107 M; 442/101, 179; 428/66.2
See application file for complete search history.

(56) References Cited

U.S. PATENT DOCUMENTS

| | | | |
|---|---|---|---|
| 4,291,794 A * | 9/1981 | Bauer | 192/107 M |
| 4,700,823 A * | 10/1987 | Winckler | 192/107 M |
| 5,083,650 A | 1/1992 | Seiz et al. | |
| 5,615,758 A * | 4/1997 | Nels | 192/113.36 |
| 5,662,993 A | 9/1997 | Winckler | |
| 5,858,511 A * | 1/1999 | Lisowsky | 428/167 |
| 5,952,249 A * | 9/1999 | Gibson et al. | 442/179 |
| 6,132,877 A * | 10/2000 | Winckler et al. | 428/408 |
| 2005/0075019 A1 * | 4/2005 | Lam et al. | 442/59 |
| 2006/0008635 A1 | 1/2006 | Dong et al. | |

FOREIGN PATENT DOCUMENTS

SU    698992 A  * 11/1979

OTHER PUBLICATIONS

Kenji Maruo, Hideki Matsumoto and Tamotsu Fujii, "High Energy Slipping Friction Material for Torque Converter Clutch", SAE Technical Paper Series 2006-01-0152, Apr. 3-6, 2006, SAE International 400 Commonwealth Drive, Warrendale, PA 15096-001.

* cited by examiner

*Primary Examiner* — Richard M. Lorence
(74) *Attorney, Agent, or Firm* — Quinn Law Group, PLLC

(57) ABSTRACT

A friction material is provided for a friction member of a torque-transmitting mechanism. The friction member has a woven carbon fiber fabric base. A coating is applied to the base to form a portion of a contact surface positioned to contact a reaction member during engagement of the torque-transmitting mechanism. The coating is a mixture of a resin binder and a friction modifier. A method of forming a friction material is also provided.

18 Claims, 4 Drawing Sheets

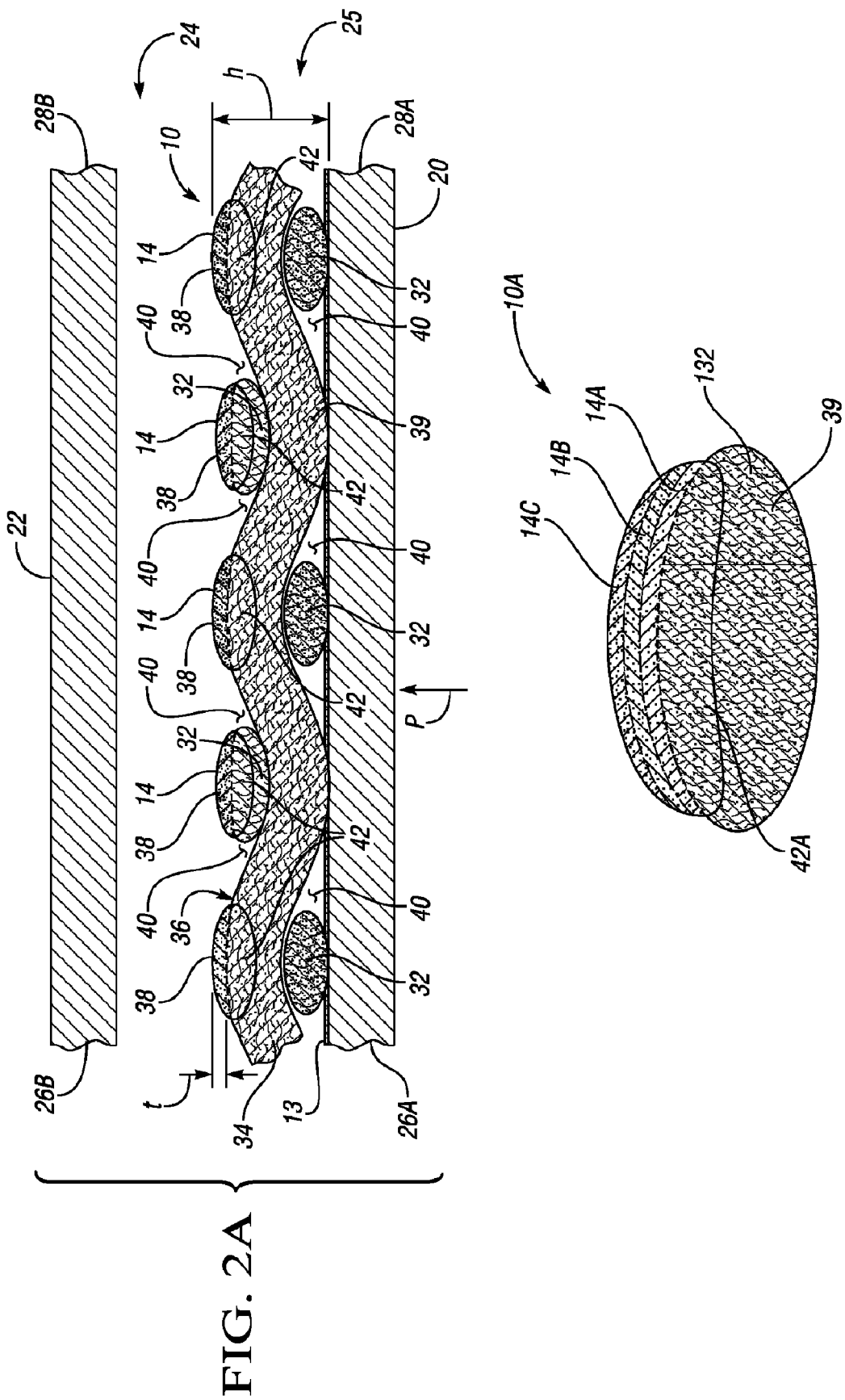

CLUTCH FRICTION MATERIAL AND METHOD OF FORMING SAME

TECHNICAL FIELD

The invention relates to a friction material for a clutch, particularly for low speed applications of an automotive clutch.

BACKGROUND OF THE INVENTION

Torque-transmitting mechanisms, such as clutches and brakes, used in vehicle transmissions are designed to enable desired torque transfer while permitting controlled slip, if desired, upon engagement. Achieving the appropriate slip is dependent on many factors, such as whether the torque-transmitting mechanism is for low pressure or high pressure engagement, and the slip speed. Clutch durability, cooling flow, and required torque capacity must be considered.

In vehicles in which an engine is coupled with a transmission via a torque converter (i.e., a fluid coupling) to provide a ratio boost, a torque converter clutch is often provided to bypass the fluid coupling under certain operating conditions, typically leading to an increase in fuel economy or enhanced ride quality. The torque converter clutch may be a wet friction interface for establishing torque transfer under a slip condition (i.e., relative rotation of opposing surfaces forming the friction interface).

SUMMARY OF THE INVENTION

A friction material is provided for a friction member of a torque-transmitting mechanism. The friction member has a woven carbon fiber fabric base. A coating is applied to the base to form a portion of a contact surface positioned to contact a reaction member during engagement of the torque-transmitting mechanism.

The coating is a mixture of a resin binder and a friction modifier. The resin binder may be a phenolic resin. The friction modifier may be carbon particles, a silica-based material, or another known friction modifier. The coating may be stratified, with multiple coats or layers, any or all of which may be different mixtures of a resin binder and a friction modifier.

The coating only forms a portion of the contact surface, to leave open channels formed by the woven fibers, increasing cooling oil flow within the clutch. The woven fibers may also be impregnated with a binder and a friction modifier, thus controlling the coefficient of friction and the thermal conductivity of the base as well. Superior friction characteristics are provided. Thermal conductivity and heat dissipation are enhanced, providing stability and longevity.

A method of forming a friction material for a clutch includes coating a surface of a woven carbon fiber base with a mixture of a resin binder and a friction modifier. Prior to coating, the method may include saturating the base with additional binder without filling the channels with the additional binder to maintain porosity. The additional binder applied to the base may be mixed with a friction modifier.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2A is a schematic cross-sectional illustration of an automotive clutch with opposing friction and reaction members, with the friction material of FIG. 1 applied to the friction member;

FIG. 2B is a schematic cross-sectional illustration of a second embodiment of a friction material with an alternative stratified coating;

DESCRIPTION OF THE PREFERRED EMBODIMENTS

Figure 1A:
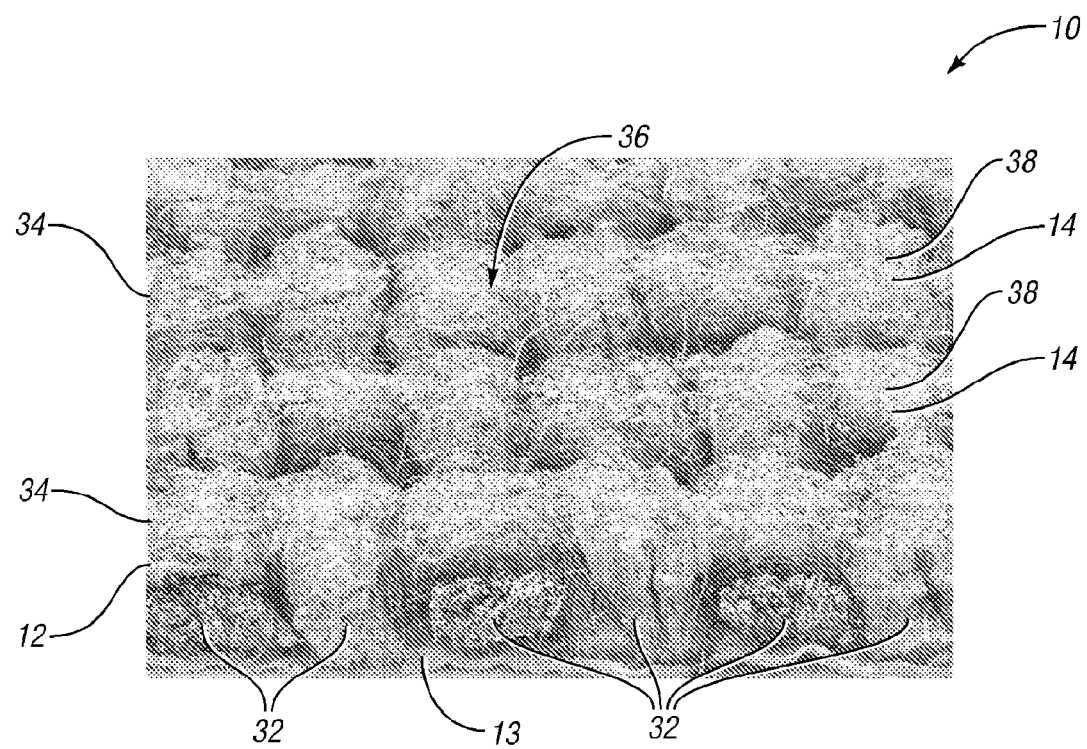
FIG. 1A is a schematic perspective photograph in fragmentary view of friction material, including a coating, for an automotive clutch.
Figure 1B:
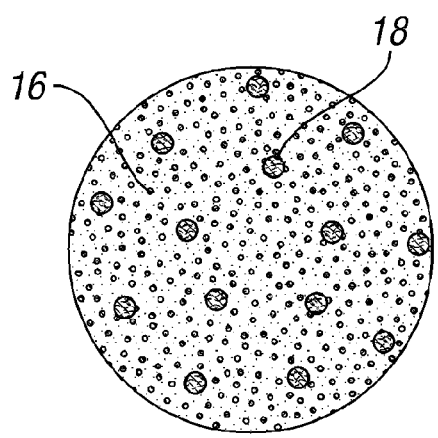
FIG. 1B is a schematic illustration of a portion of the friction material of FIG. 1A.

Referring to FIG. 1A, a friction material 10 is shown that includes a woven carbon fiber fabric base 12. A coating 14 that is a mixture of a resin binder 16 with a friction modifier 18 is applied to the base 12. The base 12 is laminated to an adhesive backing 13, which in this embodiment is a filmed nitrile phenolic adhesive. Other known processes for applying an adhesive backing may alternatively be used. A closer schematic view of the binder 16 and modifier 18 is shown in FIG. 1B. In this embodiment, the binder 16 is a resin binder and the friction modifier 18 is carbon particles, although the binder and modifier are not limited to such within the scope of the claimed invention. As used herein, a "friction modifier" is any material added to the binder to selectively modify friction performance. For example, the friction modifier 18 may be carbon particles, a silica-based material, an organically derived, or an inorganically-derived compound. As used herein an "organically derived compound" is a compound that is carbon-based. An "inorganically-derived compound" is a compound that is not carbon based. As described below, the friction material 10 provides improved performance of the friction material in comparison to a carbon fiber-based fabric alone by providing greater torque capacity, a reduced tendency for shudder and clutch hunting.

Referring to FIG. 2A, the friction material 10 is shown secured to a clutch plate 20 adjacent an opposing reaction plate 22, also referred to as a reaction member. In this embodiment, the plates 20, 22 with friction material 10 form a portion of an automotive transmission clutch 24, such as a torque converter clutch, or differential clutch, or higher speed applications such as a starting clutch or shifting clutch. The friction material 10 is suitable for nonautomotive uses as well. The plate 20 with friction material 10 forms a friction member 25. The friction material 10 is connected to the clutch plate 20 by bonding the adhesive backing 13 to the clutch plate 20. The clutch 24 is shown in schematic radial cross-section, with the clutch plate 20 and the reaction plate 22 being annular rings, each having an inner radius at a respective inner end 26A, 26B, and an outer radius at a respective outer end 28A, 28B.

Referring again to FIG. 1A, the woven fabric base 12 has a first set of strands 32 woven with a second set of strands 34. The strands 32 run lengthwise generally perpendicular to the strands 34. Each strand 32, 34 is made up of smaller fibers twisted or spun into strands. In this embodiment, the base 12 is symmetrical plain-woven, spun-yarn carbon fiber fabric, of 15-40 yarns per inch with a woven areal weight of 200-400 grams per square meter and a total coated areal weight of 500-800 grams per square meter, although the base 12 may be other woven carbon-fiber based fabrics within the scope of the claimed invention. The carbon content of the base 12 provides higher heat conductivity by increasing the surface area over which heat may be dissipated.

The coating 14 forms a portion of a contact surface 36 of the fabric base 12 that faces the reaction plate 22. More specifically, the coating 14 generally forms portions of the surface 36 that are closest to the reaction plate 22, contacting the reaction plate 22 first upon clutch engagement, whether slipping engagement or full engagement. Thus, the coating 14 is on the apexes 38 of the strands 32, 34. As is apparent in FIGS. 1A and 2A, the coating 14 appears as a "frosting" on the apexes 38. The exemplary coating 14 has a thickness t of only 0.2 mm and has an areal weight of 140-520 grams per square meter. Precise control of coating process variables prevent resin segregation and maintain open porosity within the base 10 (i.e., prevents filling of channels 40).

The entire fabric base 12 is treated with a binder 39 prior to applying the coating 14. This binder 39 is a very thin dispersion over all of the fibers within each strand of the fabric 12, and is represented schematically by shaded dots shown in FIG. 2A. The binder 39 may be the same type of binder as resin binder 16 or a different type of binder. In this embodiment, the resin binder 39 is mixed with carbon particles, as is the binder 16. The binder 39 is applied to the entire fabric base 12 by saturating the fabric base 12 or by a chemical vapor deposition, both of which are well understood by those skilled in the art.

In the embodiment of FIGS. 1A, 1B and 2A, the binder 39 coats the entire outer surface of the strands 32, 34, but is controlled in application so that it does not fill inter-strand channels 40 (i.e., spaces) left open between the woven strands 32, 34. The binder 39 helps to increase durability of the fabric base 12, especially as the friction material 10 wears and more of the base 12 forms the contact surface 36. The channels 40 increase porosity of the friction member 10. This increases compliance (i.e., the ability of the friction member 10 to conform to the reaction member 22 under clutch apply pressure P). The channels 40 also allow transmission oil to reach the surface 36 and to replenish the surface 36, affording better control of temperature at the clutch interface (i.e., at the contact surface 36), increasing thermal stability of the clutch 24.

Some of the resin binder in the coating 14 seeps into the carbon fiber-based fabric 12, instead of remaining as a coating forming a portion of the surface 36, creating a transition zone 42 between the coating 14 and a remaining portion of the fabric 12. The content of resin binder 16 in the transition zone 42 thus includes both binder applied during impregnation or deposition, as well as the binder seepage from the coating 14, and is thus greater than the content of resin binder 16 in the remaining portion, which only includes the amount of binder impregnated or deposited on the fabric 12.

Referring to FIG. 2B, an alternate embodiment of a friction member 10A having a base 12A of woven carbon fiber-based strands alike in all aspects to woven strands 32 and 34 of FIG. 2A, and represented by strand 132, has a stratified coating made up of multiple coats or layers 14A, 14B, 14C. The coating is referred to as 14A, 14B, 14C. Each coat 14A-14C is a mixture of a resin with a friction modifier, similar to coating 14. However, the resins and/or the friction modifiers used in each separate coat 14A-14C may be different. This allows the friction properties, such as coefficient of friction, to vary in each coat. Thus, as a clutch having the stratified coating 14A, 4B, 14C wears with increased use, and the coats 14A-14C wear down from the top coat 14C to the bottom coat 14A, the friction properties of the clutch will vary in a controlled manner. As with friction material 10, the friction material 10A has a transition zone 42A in which a higher resin content exists due to seepage from the coatings 14A-14C into the fiber strand 132. The fiber strands (only one strand 132 shown) also have a resin binder impregnated or deposited thereon, and are woven to provide channels for cooling oil flow to the contact surface of the friction material 10A, as with friction material 10.

Accordingly, a method of forming a friction material for an automotive clutch, such as friction material 10 or 10A, discussed above, may begin with weaving a carbon fiber base material 10 (or 10A for the embodiment of FIG. 2B). Weaving would include processing the fibers and yarns, and maintaining channels 40 for open porosity. Next, the base 12 (or base 12A of FIG. 2B) is saturated with resin 39 and a friction modifier 16, such as carbon particles. The friction modifier 16 may be applied by impregnation or chemical vapor deposition. Care is taken not to completely fill the channels 40 with the resin 39 or friction modifier 16.

Next, the base 12 or 12A is coated with a coating 14 or 14A, 14B, 14C to form portions of the surface 36. As described above, the coating 14 or 14A, 14B, 14C is a mixture of resin and a friction modifier. The coating may be done with a raster roll, reverse roll or with a knife over roll process, or various other coating processes may be used. Multiple coats may be applied, as in the coats 14A, 14B and 14C, to create a stratified coating. Application of multiple coats may either be necessitated by processing limitations which require multiple coats in order to achieve the desired overall coating thickness, or may be intended to provide varying friction characteristics in the different coats or layers. For example, as the friction material 10 or 10A wears, the coating 14 or 14A, 14B, 14C will wear away at the same time as porosity and compliance may decrease due to fiber breakdown. By providing different friction characteristics in different coats or layers, the overall performance of the friction material 10A may be controlled to respond to the other changes. An adequate amount of curing time must be allowed between each coat 14A, 14B, 14C, or after a single coating 14, in order to ensure that the resin in the coating mixture is held in place at the surface 36.

Next, a backing is applied to coated base 12 or 12A, such as by laminating the base 12 or 12A with an adhesive film 13. The laminated friction material 10 or 10A is then segmented (i.e., die cut) in preparation for bonding. The segmented friction material 10 or 10A is preassembled by placing the segments on the clutch plate 20, adequately holding the segments in place by first heating the plate 20 and then pressing (i.e., tacking) the segments onto the heated clutch plate 20. Finally, the friction material 10 or 10A is bonded to the clutch plate 20. The film 13 is a bonding agent.

Figure 3:
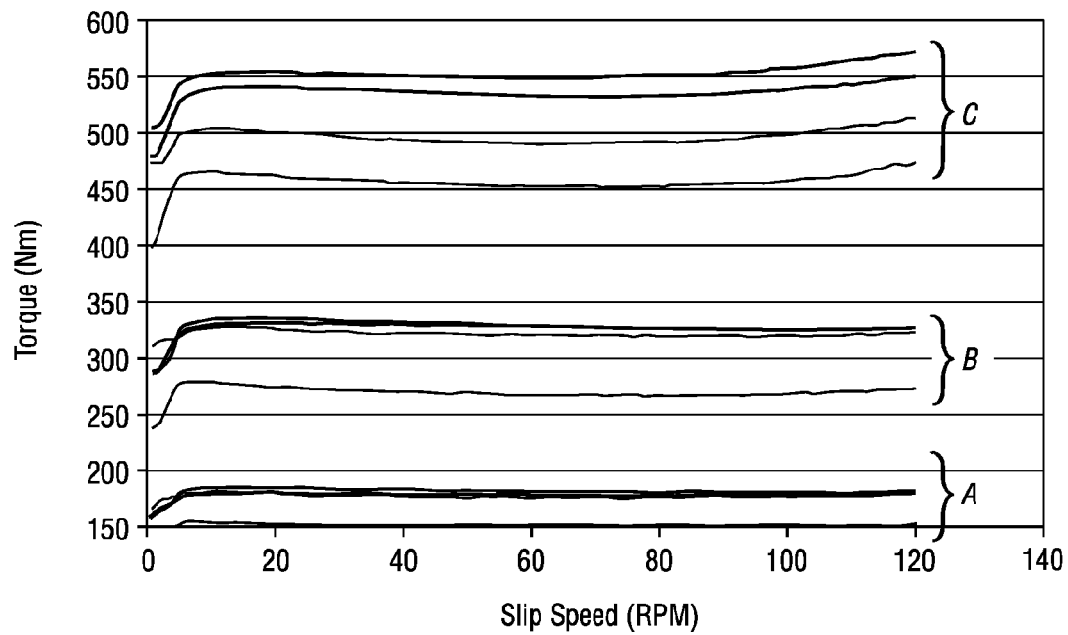
FIG. 3 is a plot of torque (N/m) versus slip speed (rpm) of a torque-transmitting mechanism having the friction material of FIG. 2B.

Referring to FIG. 3, plots of friction curves (torque (Nm) versus slip speed (rpm)) for a clutch with friction material 10A are shown with relatively thick lines. Plots of friction curves for a friction material of similar woven carbon fiber-based fabric with a resin binder applied thereto, but without the coating 14A, 14B, 14C, are shown with relatively thin lines. Two tests were carried out for each friction material at 200 kPa clutch apply pressure (Group A), 400 kPa apply pressure (Group B) and 700 kPa apply pressure (Group C). At each tested clutch apply pressure, the friction material 10A showed greater torque capacity over a broad range of slip speeds, including at very low slip speeds for most cases. A generally positive slope was achieved over a broad range of slip speeds.

Figure 4:
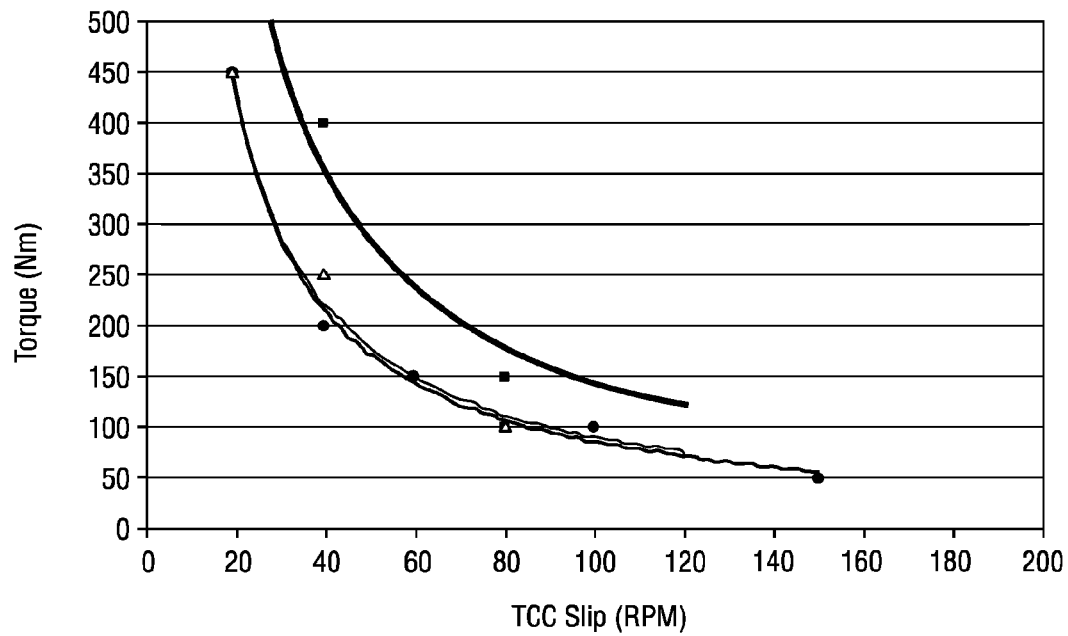
FIG. 4 is a plot of Torque (Nm) versus slip speed (rpm) indicating a maximum allowable clutch power to maintain a 141 degree Celsius temperature at the contact surface.

Referring to FIG. 4, plots of a best fit curve to data representing the maximum allowable clutch slipping power (torque (Nm) multiplied by slip speed (rpm)) that maintains a temperature at the clutch interface (e.g., at the contact surface) of not greater than 141 degrees Celsius, an accepted highest operating temperature for acceptable life of a commonly used transmission oil. The plot representing testing of a clutch with friction material 10A is shown with a relatively thick line. Plots of curves for friction materials of similar woven carbon fiber-based fabric with a resin binder applied thereto, but without the coating 14A, 14B, 14C, are shown with relatively thin lines. The plots show that the friction material 10A permitted greater power due at least in part to the thermal conductivity and porosity of the friction material 10A. Under steady state conditions, the sample of friction material 10A tested allowed 1.5 kW of power with 0.63 l/min cooling oil flow through.

Figure 5:
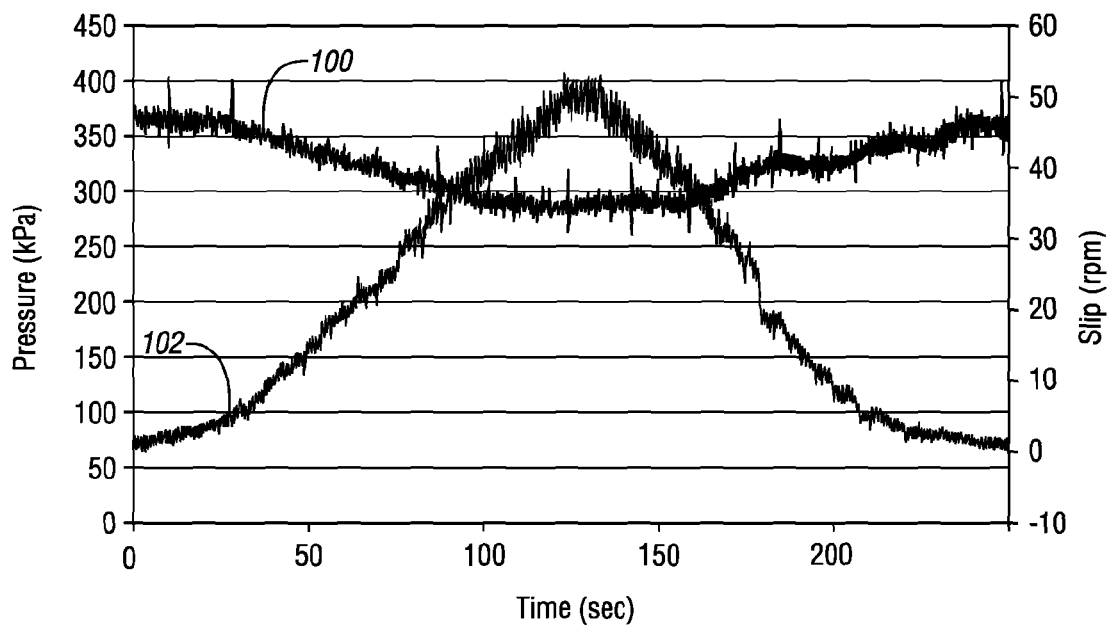
FIG. 5 is a plot of apply pressure (kPa) versus time (sec) of a torque-transmitting mechanism having the friction material of FIG. 2B.

Referring to FIG. 5, curve 100 represents clutch apply pressure (kPa) over time (sec). Curve 102 represents slip (rpm) of the clutch under the apply pressure. FIG. 5 indicates that a generally linear relationship between clutch apply pressure and slip is achieved with the friction material 10A (i.e., slip increases as apply pressure decreases). This is desirable, as clutch hunting, which occurs under a nonlinear relationship between apply pressure and slip, may be felt by the vehicle operator. Clutch hunting refers to attempts by a controller to achieve a stable slip speed under given conditions (i.e., by varying controllable factors, such as pressure), and occurs most frequently with friction material that does not provide a slip that increases linearly with decreasing apply pressure.

Figure 6:
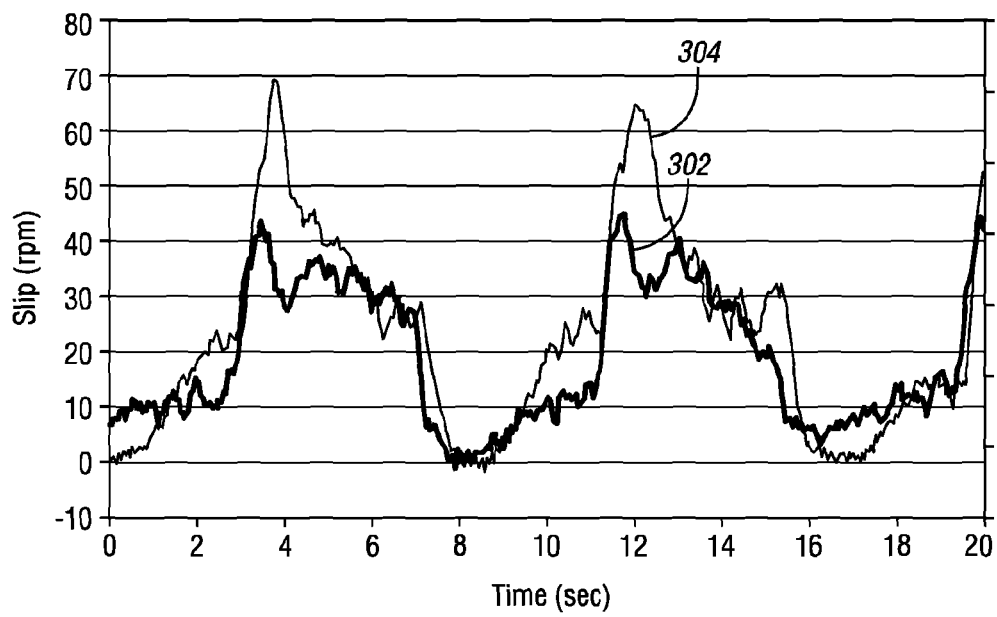
FIG. 6 is a plot of slip (rpm) versus time (sec) of a torque-transmitting mechanism having the friction material of FIG. 2B.

Referring to FIG. 6, plots of slip (rpm) versus time (sec) during repeated tip-in (i.e., vehicle accelerator pressure) at approximately 8 second intervals and at a constant vehicle speed and a target slip of 20 rpm indicate that clutch 24 (performance shown as line 302) has lower variation in slip than the typical woven fabric base without the coating, represented by line 304. Thus, the friction material 10A exhibits better controllability during dynamic maneuvers.

While the best modes for carrying out the invention have been described in detail, those familiar with the art to which this invention relates will recognize various alternative designs and embodiments for practicing the invention within the scope of the appended claims.

The invention claimed is:

1. A friction material for a friction member of a torque-transmitting mechanism, the torque-transmitting mechanism having a reaction member opposing the friction member, comprising:
 a woven carbon fiber fabric base;
 a binder applied over substantially all of the woven carbon fiber fabric base; and
 a coating applied over only a portion of the binder on the woven carbon fiber fabric base to form a portion of a contact surface positioned to contact the reaction member during engagement of the torque-transmitting mechanism; wherein the coating is a mixture of a resin binder and a friction modifier.

2. The friction material of claim 1, wherein the woven carbon fiber fabric base has a first set of strands laying lengthwise in a first direction and a second set of strands woven with the first set of strands to lay lengthwise in a second direction generally perpendicular with the first direction.

3. The friction material of claim 1, wherein the woven carbon fiber fabric base forms apexes facing the reaction member; and wherein the coating is on the apexes but is not on at least some of the contact surface further from the reaction member than the apexes.

4. The friction material of claim 3, wherein the coating is approximately 0.2 mm thick on the apexes.

5. The friction material of claim 1, wherein the binder applied to the woven carbon fiber fabric base is also a resin binder, and further comprising:
 a transition zone in a portion of the woven carbon fiber fabric base adjacent the coating with a higher resin content than a remaining portion of the woven carbon fiber fabric base due to a portion of the resin binder in the coating seeping into the woven carbon fiber fabric base adjacent the coating.

6. The friction material of claim 1, wherein the woven carbon fiber fabric base includes woven fiber strands forming inter-strand channels; wherein the coating forming only the portion of the contact surface enables flow of oil through the inter-strand channels to cool the woven carbon fiber fabric base.

7. The friction material of claim 1, wherein the resin binder is a phenolic resin and the friction modifier is carbon particles.

8. The friction material of claim 1, wherein the binder applied over substantially all of the woven carbon fiber fabric base saturates the woven carbon fiber fabric base.

9. The friction material of claim 8, wherein the woven carbon fiber fabric base is at least partially saturated with additional friction modifier.

10. The friction material of claim 1, wherein the friction modifier is one of carbon particles, a silica-based material, and an organically-derived friction modifier.

11. The friction material of claim 1, wherein the friction modifier is an inorganically-derived friction modifier.

12. A friction material for a friction member of a torque-transmitting mechanism in an automotive transmission, the torque-transmitting mechanism having a reaction member opposing the friction member, comprising:
 a woven carbon fiber fabric base having a surface; wherein a first binder is impregnated in the woven carbon fiber fabric base or is deposited on the surface;
 a mixture of a resin binder and a friction modifier applied to the woven carbon fiber fabric base with the first binder to form a first coating thereon and to form a portion of a contact surface positioned to contact the reaction member during engagement of the torque-transmitting mechanism;
 wherein the first binder is the same or is different than the resin binder in the mixture;
 wherein the woven carbon fiber fabric base includes woven strands that form inter-strand channels; wherein the first coating forms only portions of the contact surface to enable flow of oil through the inter-strand channels to cool the woven carbon fiber fabric base.

13. A method of forming a friction material for a clutch, comprising:
 saturating woven strands of a woven carbon fiber fabric base with a first binder; wherein the woven strands form inter-strand channels; wherein said saturating is without filling the channels with the binder;
 after said saturating, coating a portion of a surface of the woven carbon fiber fabric base with a mixture of a resin binder and a first friction modifier.

14. The method of claim 13, wherein the first binder is in a mixture with a friction modifier of the same type as the first friction modifier.

15. The method of claim 13, wherein said saturating is via chemical vapor deposition.

16. The method of claim 13, further comprising:
repeating said coating to create a stratified coating.

17. The method of claim 13, further comprising:
after said coating, laminating the base with an adhesive film.

18. The friction material of claim 1, wherein the coating is a first coating, and further comprising:
at least one additional coating applied substantially over only the first coating; wherein the at least one additional coating is a mixture of the resin binder and the friction modifier or a mixture of one of the resin binder and a different resin binder and one of the friction modifier and a different friction modifier.

* * * * *